United States Patent [19]

Drabsch

[11] Patent Number: 4,493,582
[45] Date of Patent: Jan. 15, 1985

[54] TENON JOINT FOR WOODEN FRAMES

[76] Inventor: Karl S. Drabsch, Berglerschleife 3-7, 8481 Pleystein/Opf., Fed. Rep. of Germany

[21] Appl. No.: 574,454

[22] Filed: Jan. 27, 1984

[30] Foreign Application Priority Data

Feb. 3, 1983 [DE] Fed. Rep. of Germany ....... 3303650

[51] Int. Cl.³ ............................................ F16B 12/44
[52] U.S. Cl. .................................. 403/382; 403/267; 403/298
[58] Field of Search ............... 403/382, 383, 298, 267, 403/268, 263

[56] References Cited

U.S. PATENT DOCUMENTS

| Re. 17,441 | 9/1929 | Tasman | 403/231 X |
| 991,722 | 5/1911 | Hourd | 403/268 |
| 1,263,116 | 4/1918 | Rockwell | 403/382 |
| 2,040,126 | 5/1936 | Grieve | 403/268 X |
| 3,299,840 | 1/1967 | Schultz | 403/267 X |

FOREIGN PATENT DOCUMENTS

| 918110 | 9/1954 | Fed. Rep. of Germany | 403/231 |
| 905238 | 4/1945 | France | 403/231 |
| 72561 | 9/1931 | Sweden | 403/219 |
| 489816 | 8/1938 | United Kingdom | 403/231 |

Primary Examiner—Andrew V. Kundrat
Attorney, Agent, or Firm—Bernard, Rothwell & Brown

[57] ABSTRACT

A multiple tenon joint for wooden frames in particular for solid wood strut constructions such as are usual in tables, chairs and furniture frames.

Owing to the generally small dimensioning of wooden components, the known joint constructions are not sufficiently stable. This problem is solved by the use of machined square multiple tenons which are pressed into round cylindrical multiple bores and are glued, the glue flowing back in open segments between the tenon and bore walls. The bores are smaller in diameter than the diagonal dimension of the tenons.

18 Claims, 3 Drawing Figures

TENON JOINT FOR WOODEN FRAMES

The present invention relates to a multiple tenon joint for wooden frames, in particular for solid wood strut connections such as are usual in tables, chairs and furniture frames.

For wooden frames, joint constructions are necessary which can resist both pulling and leverage forces.

In this connection it must be ensured that the wood profiles used are suitable for the purpose of use and are in general of small dimensions for aesthetic reasons.

It is known that for such wooden frames joints can be achieved:

(A)
By tenons which are cut or machined from a wooden part and are glued into corresponding mortices, the form of the tenon being either square, oval or round. The outer surface of the tenon is flat, ribbed or may be impressed with grooves.

The mortices correspond to the form of the tenon used.

(B)
By means of dowels which are inserted into holes bored into wooden parts and are glued. The dowels are in general circular cylindrical and have outer surfaces which are flat, ribbed or impressed with grooves.

The holes for the dowels are cylindrically bored corresponding to the dowels.

(C) By means of tenons in connection with multiple tongue joints (e.g. dovetail) suitable only for corner joints from three wooden components (British Patent GB-PS No. 489,816).

The above-described various wood joints A to C can only be mutually compared and assessed if as a basis for comparison wooden parts are considered having the same function and the same cross-section.

Moreover, account must be taken of the economic use of the wood and the greatest possible ease of manufacture in the assessment of a wood joint.

As a result the various joints can be assessed as follows:

The strength of the tenon joints A is dependent upon the ratio of the tenon thickness to the tenon length, on the overall cross-section of the tenon used for a joint, on the form of the tenon and on the possibilities for applying glue given by the tenon size and surface. The strength of the tenon joint is furthermore dependent upon the form and size of the corresponding mortice.

An individual tenon which is as large as possible, irrespective of its form, inevitably has an unfavourable thickness-to-length ratio with relatively small outer surface for glueing and relatively large weakening of the wood profile in the region of the mortice, just as cut-out or machined multiple tenons with the same tenon length with a corresponding number and arrangement of mortices.

Comparable multiple tenons have however a smaller overall cross-section than individual tenons which are as large as possible, since the multiple tenons are manufactured by division from individual tenons.

Nevertheless, with multiple tenons a greater strength can be achieved since a more fully effective penetration of the divided wood profile takes place, thus a more favourable thickness-to-length ratio of the tenons and a larger overall tenon surface can be achieved and pulling and leverage forces are resisted better.

In assembling and glueing a tenon joint, the problem is encountered that with a well-fitting tenon the glue is stripped off which leads to inadequate glueing.

The grooving or ribbing of the tenon surfaces, extremely important for glueing, becomes however technically even more difficult to manufacture as the number of tenons used for a wood joint is increased, and is almost impossible to execute by machine with an extremely thin multiple rowed tenon arrangement.

As far as possible, grooving or ribbing must be carried out in an additional working process.

Also the manufacture of the mortices corresponding to the multiple tenons is increasingly difficult with increasing number of mortices and as a result smaller spacing.

Only round mortices can be bored without problems at a small spacing. However, correspondingly round multiple tenons cannot be manufactured by machine at a small spacing.

The technical problems in the manufacture of tenon joints for wooden frames have led to the use of more easily manufactured dowel joints B which have however less strength than tenon joints.

The dowel holes bored from the front side in wooden profiles weaken these profiles.

Dowel holes in the end surface cannot be bored up to the edge of the wood profiles so that as a result the profile cross-section is less effectively used for strength transfer than with tenon joints. Dowel joints are unsuitable particularly for lateral shearing loads since the bore holes can be easily split from the side.

Dowels must be glued on both ends, and the length of the dowel and the depth of the bore hole must be exactly adapted to one another in order that the glue, placed under pressure, is caused to flow back.

In order to enable back flow, the outer surface of the dowel is grooved or ribbed. A disadvantage for the glueing strength lies here however in the mechanically damaged outer surface of grooved dowels. These do not sufficiently resist pulling and leverage forces.

Since for dowel connections dowels must be used as additional constructional elements, these dowels themselves represent a considerable cost factor.

The above-described wood joint C can remain out of consideration in the evaluation since this is suitable only for nodal joints from three wooden parts. For the joint between two wood components, this construction does not come into the question.

An object of the invention is to provide a joint construction for wooden parts which has increased stability such as is necessary in frame constructions, whilst the joint construction is easily manufactured by machine techniques.

According to one aspect of the invention, there is provided a joint construction comprising a first component having a plurality of tenons of rectangular cross-section and a second component having a plurality of bores of circular cross-section in which respective tenons of the first part are glued, wherein each side length of the cross-section of each tenon is less than the diameter of the associated bore, each diagonal of said tenon cross-section is greater than said diameter, and four gaps of segmentally-shaped cross-section between the edge surfaces of each tenon and the wall of the associated bore are substantially filled with glue.

According to another aspect of the invention, there is provided a method of manufacturing a joint construction in which a plurality of rectangular cross-section tenons are formed on a first component and a plurality of bores of circular cross-section are formed in a second component at positions to correspond with said tenons, the diameter of each bore being greater than each side length of the associated tenon cross-section and less than the diameter of the associated tenon cross-section; glue is applied within said bores; and the tenons are pressed into respective bores, whereby glue is caused to flow back in order substantially to fill segmentally-shaped gaps between the surfaces of the tenons and the inner walls of respective bores.

In order to enable easy introduction of the square multiple tenons in the circular multiple mortices, the mortices may be countersunk conically or cylindrically.

The machined multiple tenons and the mortices can be conical. This means that the tenons may be shaped as a truncated pyramid and the corresponding mortices may be frusto-conical.

For a better understanding of the invention, and to show how the same may be carried into effect, reference will now be made, by way of example, to the accompanying drawings, in which:

FIG. 1 shows an exemplary embodiment of the invention suitable for the frame of a table and will be described in more detail in the following. Such a joint construction is commercially used in furniture available under the Trade Name ZABO.

Figure 1:
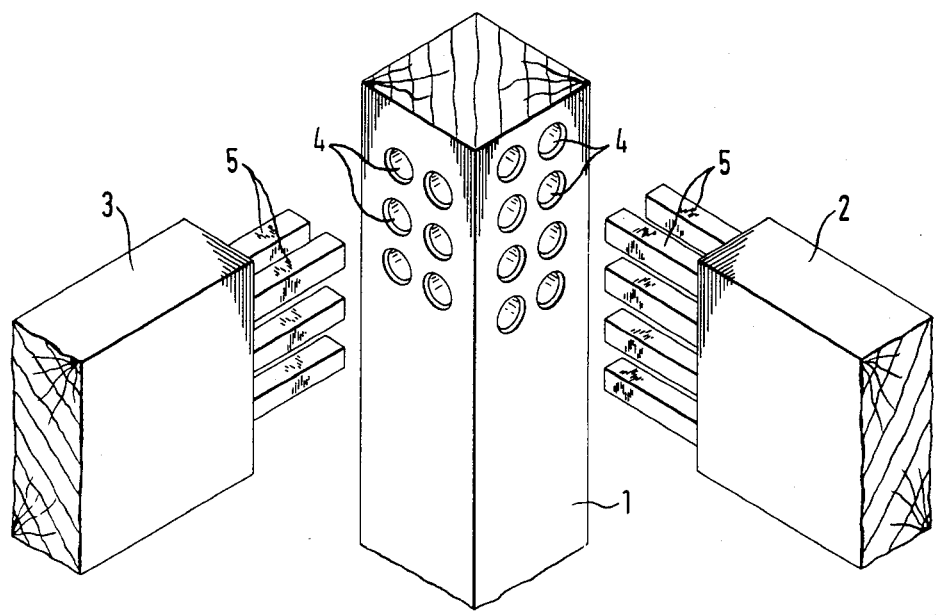
FIG. 1 is an exploded view of a three-way joint construction suitable for use in a table frame.

FIG. 1 shows a nodal joint from three wooden components: a vertical leg 1, a first top rail 2 and a second top rail 3.

The table leg 1 is provided on two adjacent sides respectively with eight and six multiple bores 4 having 9.5 mm diameter, which are arranged offset in rows. The bore spacing is 16 mm, and the bore depth 41 mm.

The two table-top rails 2 and 3 are provided respectively with eight and six square tenons 5 of 8×8 mm, exactly adapted in axial spacing to the bores 4 in the table leg. The length of the tenons 5 is 40 mm.

It may be seen that the holes 4 for the tenons 5 of rail 2 are offset in vertical height from the holes 4 for tenons 5 of rail 3.

Of course, it is not essential to provide two groups of bores 4. Within the scope of the invention joints between only two components may be constructed, e.g. for cross-members in chairs. Then only one set of bores 4 and one set of tenons 5 is necessary.

In order to complete the joint construction, glue is applied within the bores 4 and then the tenons are forced into the bores. This may be achieved by a screw press or a hydraulic press.

Figure 2:
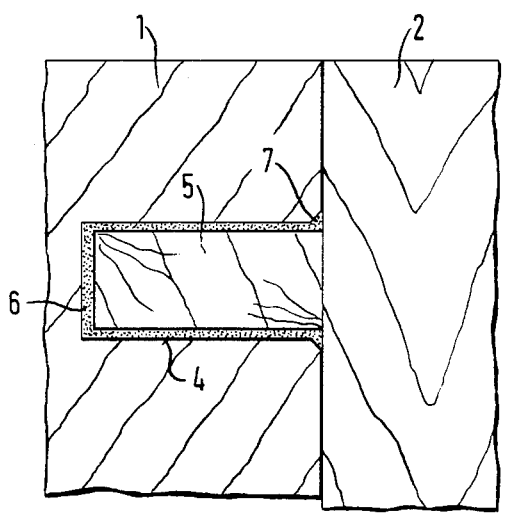
FIG. 2 is a longitudinal sectional view of one tenon and mortice.

Referring to FIG. 2, one tenon 5 inserted in its bore 4 is illustrated surrounded by glue 6. To ease insertion of the tenons, the lips of the bores may be countersunk either cylindrically or, as illustrated at 7, conically. Although not illustrated, the bores may be frusto-conical and the tenons shaped as truncated pyramids if desired, but this increases manufacturing costs.

Figure 3:
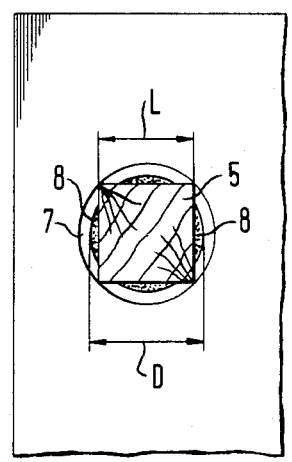
FIG. 3 is a cross-sectional view of one tenon and mortice.

FIG. 3 illustrates important dimensional relationships between the diameter of the bores and the size of the tenons. In order to form segmentally-shaped gaps 8 to allow the glue 6 to flow back freely over the tenons during insertion, the side length L of the cross-section of the tenons must be less than the bore diameter D. On the other hand, to ensure a tight fit of the tenons in the bores, the diagonal of the tenon cross-section must be greater than the bore diameter D. The tenon cross-section is rectangular, preferably square.

Advantages achievable by the invention are the following:

1. Greater stability and, considered as a whole, simpler possibilities for manufacture as compared with the earlier known constructions.
    (A) By the combination of the advantages of tenons and dowel joints, that is to say greater load resistance of tenons, in particular against pulling, leverage and shear forces, with the simpler possibilities for manufacture of dowel bores.
    (B) Omission of the ribbing or grooving of tenons and omission altogether of dowels to reduce costs.
2. Improved glueing possibilities compared with the earlier known tenon or dowel joints because of the following:
    (A) the relatively large number possible of tenons and bores gives a larger glueing surface;
    (B) the glue can flow back in the open segments between square tenons and round bores upon insertion, remains in the segments and is not stripped off;
    (C) only one-sided glue application, that is to say in the bores, is necessary; and
    (D) no glue setting times (clamping times) need be accounted for because the wood joint is immediately fixed as a result of the tight fit (not possible with tenon or dowel joints of the earlier known type).

I claim:

1. Joint construction comprising a first component having a plurality of rows of tenons of rectangular cross-section, each row including a plurality of tenons, and a second component having a plurality of bores of circular cross-section in which respective tenons of the first part are glued, wherein each side length of the cross-section of each tenon is less than the diameter of the associated bore, each diagonal of said tenon cross-section is greater than said diameter, and four gaps of sequentially-shaped cross-section between the edge surfaces of each tenon and the wall of the associated bore are substantially filled with glue.

2. Joint construction according to claim 1 wherein said cross-section is substantially square.

3. Joint construction according to claim 1 wherein said second wooden component is provided with two sets of bores on respective faces for receiving tenons of said first component and a third component respectively.

4. Joint construction according to claim 3 wherein the bores on one face are offset relative to those on the other face.

5. Joint construction according to claim 1 wherein said first and second components are of wood.

6. Joint construction according to claim 1 wherein each bore is countersunk.

7. Joint construction according to claim 1 wherein the tenons and bores are at least partially conical.

8. Method of manufacturing a joint construction in which a plurality of rows of rectangular cross-section tenons are formed on a first component, each row including a plurality of said tenons, and a plurality of bores of circular cross-section are formed in a second component at positions to correspond with said tenons, the diameter of each bore being greater than each side length of the associated tenon cross-section and less than the diameter of the associated tenon cross-section; glue is applied within said bores; and the tenons are pressed into respective bores, whereby glue is caused to flow back in order substantially to fill segmentally-shaped gaps between the surfaces of the tenons and the inner walls of respective bores.

9. A joint construction which has been manufactured according to the method of claim 8.

10. An article of furniture including at least one joint construction according to claim 1.

11. Tenon joint for two parts of a wooden frme, for example solid wood strut constructions such as tables, chairs and furniture frames, having a plurality of rows of machined tenons on the first part, each row including a plurality of said tenons, and cylindrical bores in the second part into which the tenons are pressed and glued, characterised in that the tenons have in substance a square cross-section and the length of each diagonal of the square cross-section is larger than the diameter of the associated bore and in that between the tenon walls and bore walls are provided four segment-shaped gaps filled with glue.

12. Tenon joint according to claim 11 characterised in that the bores are countersunk conically or cylindrically in order to enable easy insertion of the tenons.

13. Tenon joint according to claim 11 characterised in that the machined tenons and the bores are tapered.

14. Joint construction according to claim 1 wherein said plurality of rows of tenons comprise two parallel rows of tenons.

15. The method of claim 8 wherein said plurality of rows of tenons comprise two parallel rows of tenons.

16. A joint construction maufactured according to the method of claim 15.

17. An article of manufacture including at least one joint construction according to claim 14.

18. Tenon joint according to claim 11 wherein said plurality of rows of tenons comprise two parallel rows of tenons.

* * * * *